United States Patent [19]

Tacke

[11] Patent Number: 5,025,840

[45] Date of Patent: Jun. 25, 1991

[54] ICE CREAM DISPENSING MACHINE

[75] Inventor: Rolf D. Tacke, Tubingen, Fed. Rep. of Germany

[73] Assignee: Umberto Carnisio, Galliate, Italy

[21] Appl. No.: 290,999

[22] Filed: Dec. 28, 1988

[30] Foreign Application Priority Data

Dec. 29, 1987 [DE] Fed. Rep. of Germany ... 8717065[U]

[51] Int. Cl.$^5$ .............................................. B67C 3/26
[52] U.S. Cl. ...................................... 141/253; 141/97; 141/251; 141/275; 222/642; 99/450.1
[58] Field of Search ............... 141/94, 95, 97, 82, 141/251, 253, 255–256, 267, 270, 275–276, 284; 99/450.1, 450.7, 452; 222/642, 643

[56] References Cited

U.S. PATENT DOCUMENTS

| | | | |
|---|---|---|---|
| 1,289,907 | 12/1918 | Proper | 99/450.1 |
| 2,718,630 | 9/1955 | Wait | 141/94 |
| 3,001,557 | 9/1961 | Kückens | 141/94 |
| 3,954,126 | 5/1976 | Piana | 141/48 |
| 4,009,740 | 3/1977 | Michielli | 141/174 |
| 4,174,742 | 11/1979 | Murphey | 141/87 |
| 4,598,742 | 7/1986 | Taylor | 141/83 |
| 4,625,776 | 12/1986 | Mikkelsen | 141/83 |
| 4,645,093 | 2/1987 | Jones | 141/98 |
| 4,787,539 | 11/1988 | Uchida et al. | 222/643 |

Primary Examiner—Henry J. Recla
Assistant Examiner—Keith Kupferschmid
Attorney, Agent, or Firm—Richard J. Birch

[57] ABSTRACT

An ice cream dispensing machine having at least one storage container for storing liquid ice cream. The storage container is connected to a freezing cylinder that contains a mixing spiral. The freezing cylinder is connected to a dispensing apparatus that includes a vertically movable ice cream cornet holder. Cornet position sensing switches are employed to initiate machine operations. Timing clocks control the dispensing of the ice cream and provide a safety factor with respect to the maximum quantity of ice cream that can be dispensed during a single dispensing operation. The time interval between two successive dispensing operations is controlled to insure that sufficient time has elapsed for complete freezing of the liquid ice cream for the next dispensing operation.

4 Claims, 3 Drawing Sheets

ICE CREAM DISPENSING MACHINE

BACKGROUND OF THE INVENTION

The present invention relates to material dispensers in general, and more particularly, to a machine for dispensing portioned ice cream from at least one or several fluid stores of preprepared ice cream.

Automatic devices for dispensing ice cream and similar materials are known to the art. Representative examples include:

DE-2 248 050 describes a ice cream selling machine which automatically fills ice cream into a cup after insertion of a coin or pressing a button. Previously prepared firm ice cream is used in this machine. The ice cream is scraped off a storage block of ice cream with a scraper and then dispensed into a cup by means of a dispenser. The cups are taken from a storage pile and the dispensing nozzle is introduced separately. During the ice cream dispensing process the cups and the dispensing nozzles are not moved relative to one another.

DE-2 004 412 describes an ice cream machine having an automatic introducing device with which the ice cream cone or cornet is transported from a storage container to an automatic dispensing device. Since the dispensing height of the ice cream cornet should be independent of the mounting height of the cornet storage container the automatic cornet introducing device is mechanically complicated. The ice cream cornets are transported via a lift to the ice cream dispensing device whereby they change the transporting device several times. Ice cream cornets and the ice cream dispensing device remain relatively still in the filling stage.

DE-1 186 249 describes a dispensing device for half-solid ice cream masses that includes an ice cream portioning device. Cylindrically packed ice cream rods are divided up into smaller portions by means of cutting elements, the size of which correspond to the portions to be filled into the ice cream waffles. These portions then fall into the ice cream waffles which are transported on by means of a transport chain. The surface of this portion is then formed by means of a rotating heated form dome.

U.S. Pat. No. 4,241,847 describes an automatic container transporting device, which removes a container from a storage location, brings the container to a filling station and, after filling, carries the filled container to a removal station. Special forms and safety devices are described to insure a correct transportation of the container.

It is a general object of the invention to provide an automatic ice cream dispensing machine.

It is a specific object of the invention to provide a self-service ice cream dispensing machine.

It is still another object of the invention to provide an automatic self-service ice cream dispensing machine having improved forming and quantity control of the dispensed ice cream.

It is a feature of the invention that the ice cream dispensing apparatus utilizes relatively simple mechanical components.

It is another feature of the invention that the self-service automatic ice cream dispenser is both operationally safe as well as safe to the user.

BRIEF DESCRIPTION OF THE INVENTION

The invention is an automatic ice cream dispensing device which after manual placement of an ice cream cone or cornet in a cornet holding ring provides for the automatic filling of the cornet, whereby the ice cream takes on the characteristic conical shape of the cornet. The cornet is placed in a holding ring which is arranged so that it is vertically moveable under the ice cream dispensing device. The filling of the cornet begins when the holding ring with the cornet is situated in its most upper position under the ice cream dispenser. The cornet remains for a certain amount of time in the filling position. The amount of time is controlled by a timing clock so that the cornet can be filled and the lower wider part of the ice cream cone created. The cornet is then moved downwardly while the ice cream continues to be dispensed to form the tapering shape of an ice cream cone. A second timer determines when to terminate the ice cream dispensing. Thus, by controlling the two timers, the size and the form of the ice cream portion can be adjusted.

Since the ice cream dispensing machine is arranged for self-service, additional monitoring devices are provided. The machine has a timer which limits the maximum amount dispensed for each ice cream portion and another timer which determines a minimum time between the dispensing of two ice cream portions. The minimum dispensing interval time is required so that the still running fluid ice cream from the ice cream storage container has time to become firm in the freezing cylinder and thus provide a uniformly frozen ice cream mixture for the dispensing of each ice cream portion.

Whether a cornet is placed in the cornet holder at all is checked by means of a light sensor.

The storage container for the liquid ice cream is monitored with filling measurers which emit a "low level" signal when the ice cream reaches a minimum filling level. If the filling level sinks further, the machine switches off to prevent a freezing of the machine.

In the self-service operation the machine is started by the insertion of a coin. Only after this is access allowed to the cornet storage container and only after this can the covering door, which protects the dispensing device be opened. Through this blocking mechanism a misuse of the machine is prevented.

The machine can be used in a service operation in which case it is started by means of a start button instead of a coin insertion.

The machine is operated in different operation conditions:

A pre-stage condition, in which the machine works with the full cooling capacity in order to obtain as quickly as possible ice cream ready to dispense from the liquid ice cream after switching on the machine or if a transfer is made from any energy saving circuit to the normal operation condition.

A normal operation condition in which the amount of the fluid ice cream which flows into the freezing cylinder after the dispensing of an ice cream portion always freezes and thus a frozen mass of ice cream is always available in the freezing cylinder.

A saving circuit with which for example left ice cream can be conserved over night. In this operating condition the cooling capacity is reduced so that the ice cream in the freezing cylinder also becomes liquid.

Finally, a washing circuit in which the machine is flushed out with hot water, whereby the cooler is totally switched off but the mixing spiral turns.

BRIEF DESCRIPTION OF THE DRAWINGS

The objects and features of the invention will best be understood from a detailed description of a preferred embodiment of the machine, selected for purposes of illustration, and shown in the accompanying drawings in which.

Figure 1:
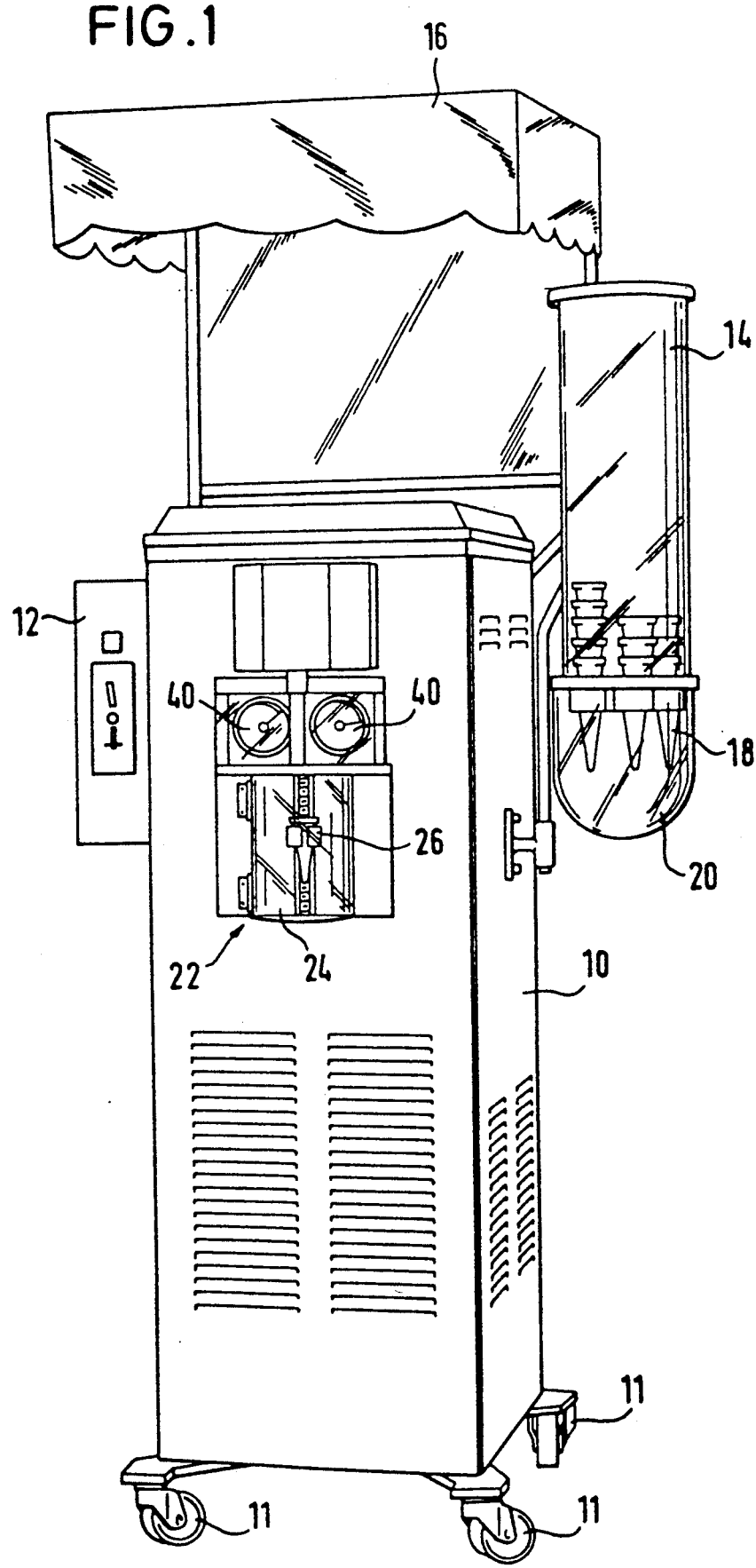
FIG. 1 is a perspective total view of an ice cream machine constructed in accordance with the invention.

Referring to the Figures, the ice cream machine is composed of a machine casing 10, which is secured against tipping over and which is moveable on wheels 11 which are situated on the far outer side, a usual coin checker 12, a cornet dispenser 14 and a baldachin 16 that protects the machine and provides space for advertising materials.

Figure 3:
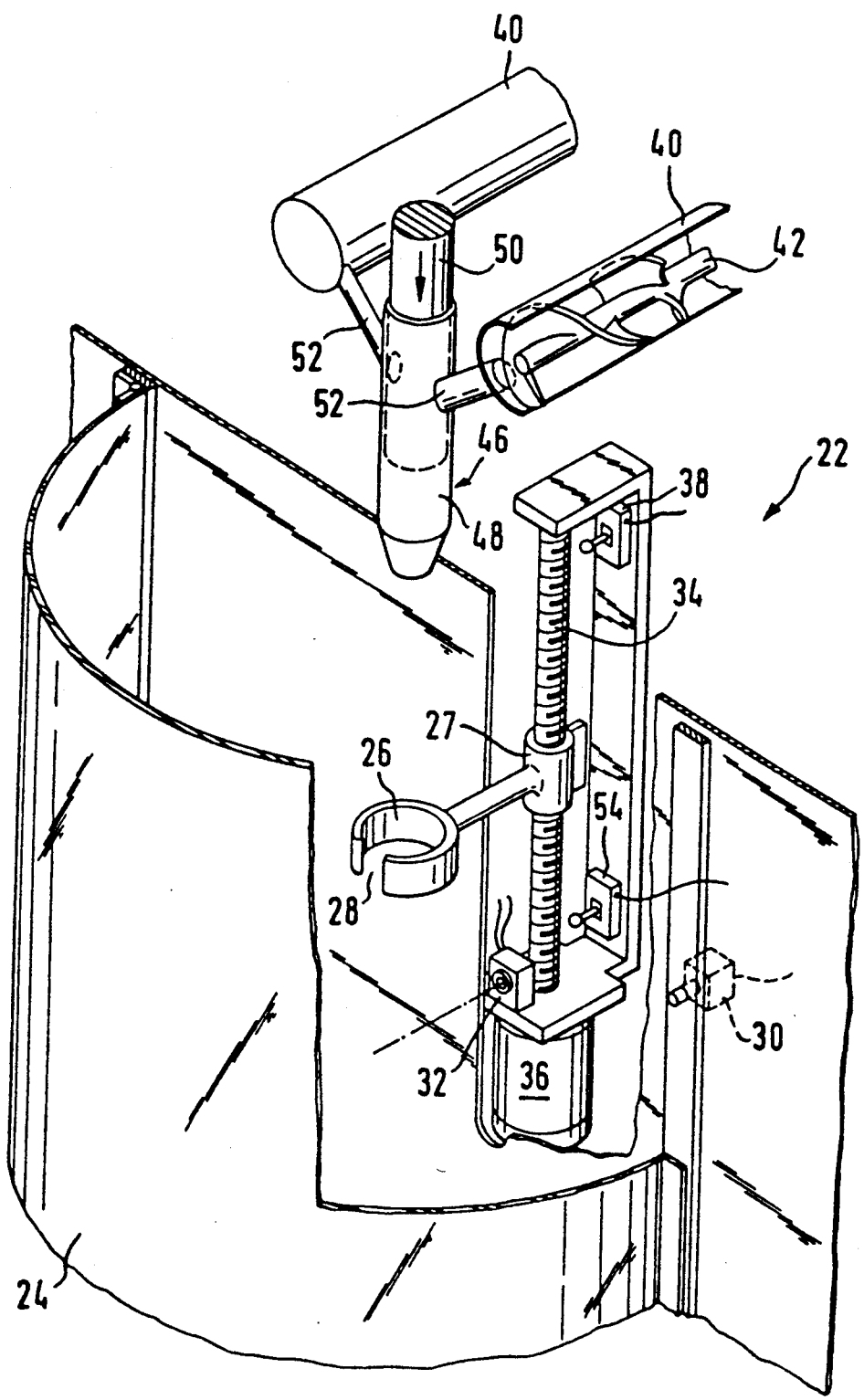
FIG. 3 is a perspective detailed view of the automatic ice cream dispensing portion of the machine.

After a suitable coin has been inserted into the coin checker 12, a customer takes an ice cream cornet 18 from a cornet dispenser 14. At the bottom of cornet dispenser 14 there is a flap 20 that can be opened so that an ice cream cone or cornet 18 can be pulled down from a stack of cornets. The ice cream cornet 18 is placed in a cornet holding ring 26 (FIG. 3). The cornet holding ring 26 has an indentation 28 at the front which facilitates the placing in and taking out of the ice cream cornet 18.

After placement of the cornet in holding ring 26, the covering flap 24 is closed. A door contact 30 is checked to determine if the covering door 24 is closed and a light sensor 32 is checked to determine if an ice cream cornet 18 is actually placed in the holder 26. Only after successful examination is the cornet filling process initiated.

Figure 2:
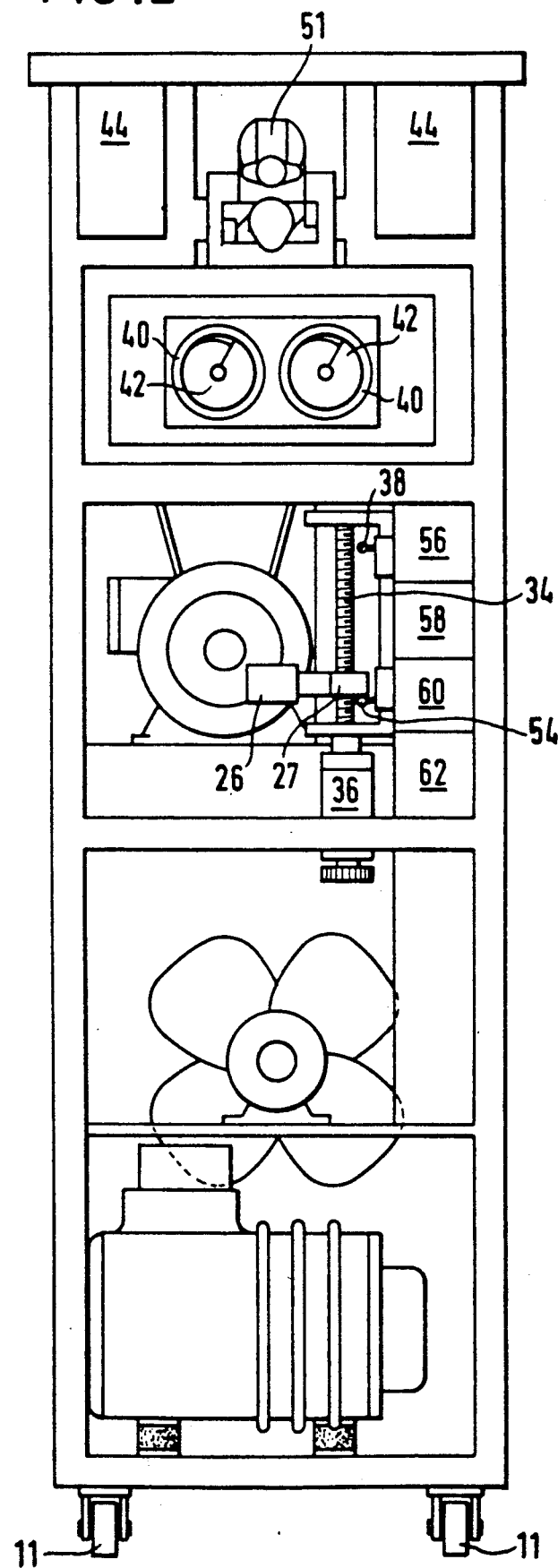
FIG. 2 is a schematic inner view of the machine from the front.

The holding ring 26 is firstly driven upwardly with the cornet 18. The cornet holding ring 26 is secured to a female piece 27 that is mounted on a lead screw 34 which is driven by an electric motor 36. When the upper end contact 38 is reached the upwards movement of the holding ring 26 is stopped. During the upward movement of the cornet holding ring, the cooling of the freezing cylinders 40 is activated and the driving force of the mixing spiral 42 which is situated therein is started. In the freezing cylinders 40 the liquid ice cream which is stored in the cooled and insulated storage containers 44 (FIG. 2) is transformed by an additional lowering of the temperature and by the mixing and propulsion spirals 42 into a mass of ice cream ready to eat. This mass is then available under pressure in the mixer head 46. The mixer head 46 is composed of a discharge pipe 48 into which the lead channels 52 of the freezing cylinders 40 open out and are closed or opened by the pistons 50. The piston 50 is moved by a piston motor 51 with an eccentric shaft.

If the cornet holder 26 with the ice cream cornet 18 is in its highest position then the piston 50 opens the openings of the lead channels 52 and the ice cream mass goes into the ice cream cornet 18 via the discharge pipe 48. Simultaneously three time monitoring clocks begin:

a protection clock 56 which determines the maximum time in which the piston 50 must enable the ice dispensing and thus limits the ice cream portion size to a maximal value do to safety reasons, an opening limitation clock 58 which determined a freely settable time in which the piston 50 makes way for the ice dispensing within the maximum time in order to predetermine a desired ice cream portion size which is smaller than the maximum portion size, and a shutdown clock 60 which determined the amount of the time where the cornet holding ring 26 remains in its upper position whereby the width of the "ice cream cone" is controlled.

If the shutdown clock 60 has run out then the cornet holding ring 26 with the ice cream cornet 18 begins to sink again while the motor 36 drives the lead screw 34 in the opposite turning direction. If one of the clocks 56 or 58 has run out or if at the latest the cornet holding ring 26 has reached the lower end contact 54 then the piston 50 closes the lead channels 52. No ice cream is then discharged. The locking or the covering door 24 is released so that the customer can then open the door 24 and can remove the ice cream cone.

With the reaching of the lower end contact 54 and after the piston 50 has closed the lead channels 52, a tracking clock 62 is started which ensures that as long as it runs the freezing cylinder 40 is further cooled and the mixing spiral 42 still runs. This happens so that the liquid ice cream replacing the removed ice cream also becomes a usable ice cream mass and thus the ice cream machine is ready for the dispensing of the next ice cream portion. The tracking clock 62 insures that at peak operation each customer obtains a totally frozen ice cream and not a still liquid ice cream mixture.

The ice cream storage containers 44 contain level measurers which emit a signal when the storage containers 44 are nearly empty for a refilling of the containers 44 and switch the machine off if the level of ice cream storage sinks further so that the machine does not freeze.

Apart from the normal operation condition there is also a so-called energy saving circuit with which the cooling thermostat can be run down such that the ice cream mass in the freezing cylinders 40 becomes liquid. With transition into the normal operating condition as at the beginning with the switching on of the machine the total cooling capacity is used so that the machine is ready for operation as quickly as possible. After this the cooling capacity is taken back to the normal operation level.

Having described in detail a preferred embodiment of my invention, it will now be apparent to those skilled in the art that numerous modifications can be made therein without departing from the scope of the invention as defined in the following claims:

What I claim is:

1. Machine for portioned dispensing of ice cream from at least one liquid stores of pre-prepared ice cream, said machine comprising: at least one storage container (44) for storing liquid ice cream, said storage container being arranged in a freely installable casing (10) and being connected to a freezing cylinder (40) in which by additional cooling and by a mixing spiral (42) an ice cream mass ready for use is made available, which ice cream mass can be filled into an ice cream cornet (18) by means of a dispensing device (22) in which the ice cream cornet (18) is vertically moveable so that a cone shaped ice cream for is created, a first timing clock (56) which limits the maximum dispensable amount of ice cream for each portion; a second timing clock (58) which determines the actually dispensed amount for each portion; a third timing clock (60) which controls the length of time for which the ice cream cornet (18) remains in its upper position and thus determines the width of the ice cream cone; and, a fourth timing clock (62) which determines the minimum time between the dispensing of two ice cream portions.

2. The machine of claim 1, wherein said dispensing device (22) includes a light sensor (32) for checking the presence of an ice cream cornet (18) in the cornet holding ring (26) and a covering door (24) which has a door contact (30) which permits the dispensing device (22) to start when the covering door (24) is closed.

3. The machine of claim 1 further comprising a covering door (24) and a cornet dispenser (14) and including means which can be opened only if a sufficient coin or amount of coins have been inserted into the coin examining device (12).

4. The machine of claim 1 further comprising a plurality of storage containers (44) having a corresponding plurality of freezing means (40) and associated mixing spirals (42), said plurality of storage containers being connected to the dispensing device (22).

* * * * *